United States Patent [19]

Cullison et al.

[11] Patent Number: 5,155,833

[45] Date of Patent: Oct. 13, 1992

[54] MULTI-PURPOSE CACHE MEMORY SELECTIVELY ADDRESSABLE EITHER AS A BOOT MEMORY OR AS A CACHE MEMORY

[75] Inventors: Dennis L. Cullison, Naperville; Thomas A. Wagner, Warrenville, both of Ill.

[73] Assignee: AT&T Bell Laboratories, Murray Hill, N.J.

[21] Appl. No.: 48,151

[22] Filed: May 11, 1987

[51] Int. Cl.⁵ .............................................. G06F 12/00
[52] U.S. Cl. ........................................ 395/425; 395/700; 364/280.2; 364/280; 364/243.41; 364/230; 364/DIG. 1
[58] Field of Search ... 364/200 MS File, 900 MS File; 340/731, 717, 723; 379/28, 94, 96; 371/19, 21, 24, 27; 395/425, 700

[56] References Cited

U.S. PATENT DOCUMENTS

| | | | |
|---|---|---|---|
| 4,070,704 | 1/1978 | Calle et al. | 364/200 |
| 4,195,341 | 3/1980 | Joyce | 364/200 |
| 4,236,207 | 11/1980 | Rado | 364/200 |
| 4,257,097 | 3/1981 | Moran | 364/200 |
| 4,313,158 | 1/1982 | Porter et al. | 364/200 |
| 4,354,225 | 10/1982 | Frieder et al. | 364/200 |
| 4,371,929 | 2/1983 | Brann et al. | 364/200 |
| 4,419,725 | 12/1983 | George | 364/200 |
| 4,430,704 | 2/1984 | Page et al. | 364/200 |
| 4,439,829 | 3/1984 | Tsiang | 364/200 |
| 4,442,488 | 4/1984 | Hall | 364/200 |
| 4,459,662 | 7/1984 | Skelton et al. | 364/200 |
| 4,545,016 | 10/1985 | Berger | 364/200 |
| 4,580,240 | 4/1986 | Watanabe | 364/900 |
| 4,590,556 | 5/1986 | Berger | 364/200 |
| 4,608,631 | 8/1986 | Stiffler et al. | 364/200 |
| 4,631,668 | 12/1986 | Kubo et al. | 364/200 |
| 4,654,819 | 3/1987 | Stiffler et al. | 364/200 |
| 4,663,707 | 5/1987 | Dawson | 364/200 |
| 4,679,166 | 7/1987 | Berger | 364/200 |
| 4,680,702 | 7/1987 | McCarthy | 364/200 |
| 4,685,082 | 8/1987 | Cheung | 364/200 |
| 4,719,568 | 1/1988 | Carruba | 364/200 |
| 4,720,812 | 1/1988 | Kao | 364/900 |
| 4,727,484 | 2/1988 | Saito | 364/200 |
| 4,740,889 | 4/1988 | Motersole | 364/200 |
| 4,779,189 | 10/1988 | Legvold | 364/200 |
| 4,780,808 | 10/1988 | Moreno | 364/200 |
| 4,788,656 | 11/1988 | Sternberger | 364/900 |
| 4,794,524 | 12/1988 | Carberry et al. | 364/200 |
| 4,819,154 | 4/1989 | Stiffler | 364/200 |
| 4,868,738 | 9/1989 | Kish | 364/200 |
| 4,899,275 | 2/1990 | Sachs | 364/200 |

FOREIGN PATENT DOCUMENTS 1000413 11/1976 Canada ............................. 354/237

OTHER PUBLICATIONS

R. J. Gallagher, "Read-Only Storage/Random-Access Memory Mode Change" *IBM Technical Disclosure Bulletin*, vol. 21, No. 10 (Mar. 1979) pp. 4100–4101.
S. G. Hogan et al., "Loading & Running a Program Without Main Storage" *IBM Technical Disclosure Bulletin*, vol. 20, No. 10 (Mar. 1978).

*Primary Examiner*—Thomas C. Lee
*Assistant Examiner*—Eric Coleman
*Attorney, Agent, or Firm*—David Volejnicek

[57] ABSTRACT

In a master-slave multiprocessor (FIG. 1), a slave processor (110) includes a random access memory array (119) that serves at initialization time as the slave processor's boot memory and that serves during normal operation time as the slave processor's cache memory. A master processor (120) writes the slave processor's boot program into the memory array when the memory array is to serve as the boot memory, i.e., following system reset.

2 Claims, 2 Drawing Sheets

MULTI-PURPOSE CACHE MEMORY SELECTIVELY ADDRESSABLE EITHER AS A BOOT MEMORY OR AS A CACHE MEMORY

TECHNICAL FIELD

The invention relates to processors in general and to memories of data processors in particular.

BACKGROUND OF THE INVENTION

Today's typical processor includes special purpose memories provided to enhance ease of use and performance of the processor. Included among these memories are a boot memory—typically a read only memory (ROM)—that stores a boot program whose execution by the processor's central processing unit (CPU) upon system power-up or reset automatically initializes the CPU, and a cache memory—implemented as a random access memory (RAM)—that serves during normal processor operation as a high-speed buffer for information—illustratively either or both data and instructions—passing between the CPU and the processor's main on-line memory.

Storage devices used to implement such memories add to the cost of the processor, and also occupy valuable circuit board space. The latter is especially a serious consideration in the case of single-board processors, where a whole processor is implemented on a single circuit board. In such processors, providing of such special-purpose memories may potentially be done only at the sacrifice of some other processor capabilities, because circuit board space may not be available for circuitry needed to implement both.

Accordingly, it is a problem in the prior art to provide special-purpose memory functions in a processor with the minimum number of memory devices so as to minimize processor cost and to occupy minimum circuit board space.

SUMMARY OF THE INVENTION

The invention is directed to solving these and other problems of the prior art. According to the invention, there is provided a memory that serves as different special-purpose memories at different times. A control arrangement causes the memory at one time to serve a first function exclusive of a second function, and at another time to serve the second function exclusive of the first function. Specifically, an apparatus such as a processor includes a processing unit, a memory coupled to the processing unit, and an arrangement coupled to the memory for selectively causing the memory: (a) to store at one time a boot program for execution by the processing unit at initialization, and (b) to buffer at another time information passing between the processing unit and another memory during normal operation. The memory is thus caused to selectively serve as either a boot memory or a cache memory for the processing unit. The apparatus further includes means for effecting storage of the boot program in the memory when the memory is serving as the boot memory. Illustratively, the apparatus is a multiprocessor wherein the processing unit and memory are parts of one processor and the means for effecting storage of the boot program in the memory is another processor.

Because the memory serves different functions at different times, separate memory devices need not be included in the system to implement each function. Rather, the functions are all implemented via the same memory device. Elimination of extra memory devices beneficially lowers system cost and reduces the circuit board area occupied by memory devices.

These and other advantages and features of the present invention will become apparent from the following description of an illustrative embodiment of the invention taken together with the drawing.

DETAILED DESCRIPTION

Figure 1:
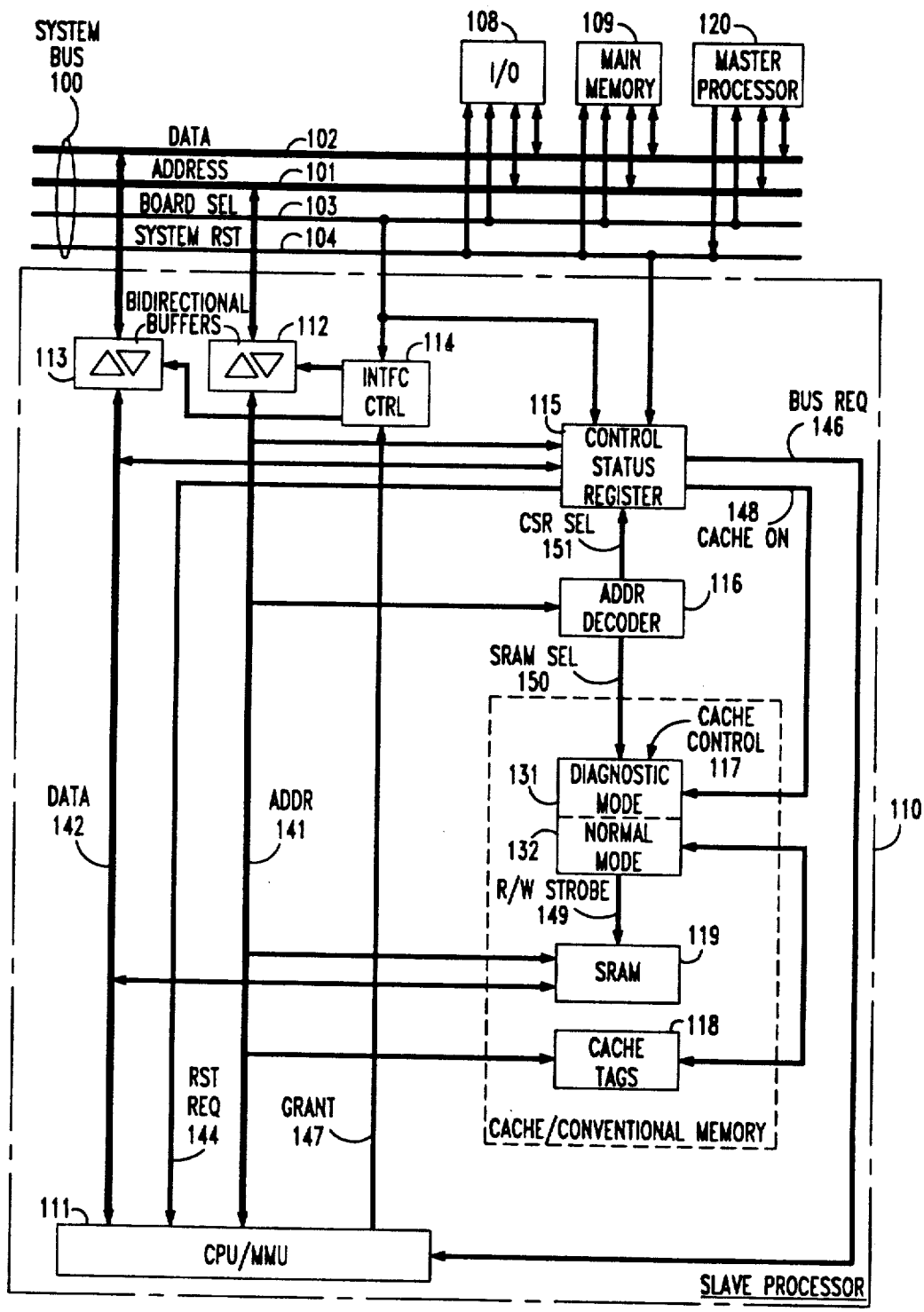
FIG. 1 is a block diagram of a processing system that includes an illustrative embodiment of the invention.

FIG. 1 shows a multiprocessor system. Illustratively, this system is the 3B2/600 computer of AT&T expanded into a master-slave multiprocessor configuration by connection thereto of a second processor. The original processor of the 3B2/600 computer functions as master processor 120 of the system. The added second processor functions as slave processor 110. Illustratively, processor 110 is substantially a duplicate of processor 120, modified as described below. Slave processor 110 is connected to an input and output (I/O) slot of system bus 100 of the 3B2/600 computer. Illustratively, a main on-line memory 109 and an I/O subsystem 108 such as a disk are connected to other slots of system bus 100. Bus 100 connects units 108-110 to master processor 120 for communication.

System bus 100 includes an ADDRESS bus 101, a DATA bus 102, BOARD SELECT lines 103, and a SYSTEM RESET line 104.

Slave processor 110 includes a central processing unit (CPU) and memory management unit (MMU) 111. Illustratively, CPU/MMU 111 comprises the WE® 32100 microprocessor chip set. CPU/MMU 111 is connected to ADDRESS bus 101 and DATA bus 102 through bidirectional tri-state buffers 112 and 113, respectively. DATA lines 142 connect CPU/MMU 111 to buffer 113 while ADDRESS lines 141 connect CPU/MMU 111 to buffer 112. Buffers 112 and 113 are under control of interface controller 114, which is connected to the one of the BOARD SELECT lines 103 that is associated with slave processor 110, and to CPU/MMU 111 via a GRANT line 147.

Slave processor 110 also includes a control status register (CSR) 115. CSR 115 is connected to the one line of BOARD SELECT lines 103 that is associated with slave processor 110, and, in addition, is connected to SYSTEM RESET line 104, DATA lines 142, ADDRESS lines 141, a RESET REQUEST line 144, a BUS REQUEST line 146, and a CACHEON line 148. Lines 144 and 146 connect CSR 115 with CPU/MMU 111.

Slave processor 110 further includes a static random access memory (SRAM) array 119. SRAM array 119 is connected to ADDRESS lines 141 and DATA lines 142. SRAM array 119 is controlled by a cache controller 117 through a read and write (RW) strobe line 149.

As the name implies, cache controller 117 typically causes SRAM array 119 to function as a cache memory. Logically, cache controller 117 is divided into two control portions 131 and 132, each of which is active at different times and each of which causes SRAM array 119 to operate in a different mode. Control portion 132 causes array 119 to operate in conventional cache memory mode, as a virtual address-and-data cache memory for buffering information passing between CPU/MMU 111 and main memory 109. Since operating as a conventional cache, each memory location of memory is addressable by any one of a plurality of addresses. Control portion 132 is aided by a conventional tag memory 118 associated with array 119 and communicatively connected to control portion 132. Tag memory 118 is also connected to ADDRESS lines 141. Control portion 131 causes array 119 to operate in "diagnostic" mode, wherein individual locations of array 119 may be addressed and read or written. Control portion 131 is aided by a conventional address decoder 116. Decoder 116 is connected to control portion 131 by SRAM SELECT line 150, is connected to CSR 115 by CSR SELECT line 151, and is also connected to ADDRESS lines 141. Selection of which one of the two control portions 131 and 132 is active and in control of array 119, and hence in which mode array 119 is operating, is made by CSR 115 via a CACHEON line 148.

Figure 2:
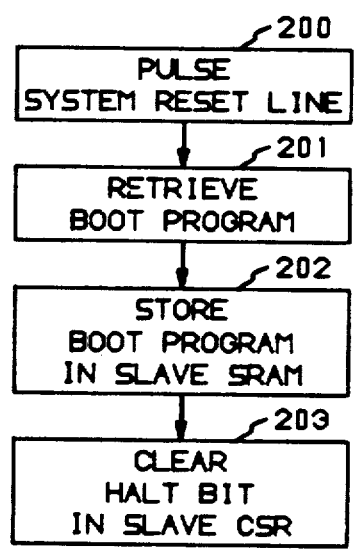
FIG. 2 flowcharts relevant portions of initializing operations of the master processor of FIG. 1.

Operational aspects of the system of the FIG. 1 that are relevant to an understanding of the invention will now be described in conjunction with FIG. 2.

Upon system power-up or re-initialization, master processor 120 pulses (momentarily asserts) SYSTEM RESET line 104, at step 200. This action sets a RESET bit and a HALT bit of CSR 115. Setting of the HALT bit leads CSR 115 to assert BUS REQUEST line 146. Setting of the RESET bit leads CSR 115 to assert RESET REQUEST line 144.

CPU/MMU 111 responds to assertion of RESET REQUEST line 144 by resetting slave processor 110, including clearing certain bits in CSR 115, in particular the RESET bit and a CACHEON bit. Clearing of the RESET bit and the CACHEON bit causes CSR 115 to deassert RESET REQUEST line 146 and CACHEON line 148. CPU/MMU 111 responds to the request signal on BUS REQUEST line 146, which indicates the highest priority request for access to ADDRESS and DATA lines 141 and 142, by asserting GRANT line 147 and by stopping further activities. CPU/MMU 111 then waits for BUS REQUEST line 144 to be deasserted.

Following its momentary assertion of SYSTEM RESET line 104, master processor 120 retrieves a boot program for initializing CPU/MMU 111 from either main memory 109 or secondary memory—disk—of I/O subsystem 108, at step 201, and effects storage of the program in SRAM 119, at step 202. Illustratively, it does so as follows.

After it has retrieved an instruction of the boot program from memory, master processor 120 asserts the line of the BOARD SELECT lines 103 that is associated with slave processor 110, places an address of the address spectrum of SRAM array 119 at which the instruction is to be stored on ADDRESS bus 101, and places the instruction on DATA bus 102.

Assertion of slave processor's BOARD SELECT line 103 while GRANT line 147 is asserted causes interface control 114 to open buffers 112 and 113 thereby to transfer the information from ADDRESS and DATA buses 101 and 102 onto ADDRESS and DATA lines 141 and 142, respectively. Address decoder 116 examines the address appearing on ADDRESS lines 141. When it detects an address lying within the address spectrum of SRAM array 119, it asserts SRAM SELECT line 150.

Cache control portion 131 responds to signals on SRAM SELECT line 150 while CACHEON line 148 is deasserted, by issuing a strobe signal to SRAM array 119 via R/W strobe line 149. SRAM array 119 responds to the strobe signal by storing the instruction conveyed by DATA lines 142 in the location addressed by ADDRESS lines 141.

This process is repeated until master processor 120 has stored the whole boot program in SRAM array 119. Master processor 120 then accesses and writes CSR 115 to reset the HALT bit, at step 203, in the same manner as it writes SRAM array 119. Address decoder 116 recognizes the address generated by master processor 120 as being an address of CSR 115. Address decoder 116 therefore asserts CSR SELECT line 151 to cause CSR 115 to respond to the address and data appearing on ADDRESS lines 141 and DATA lines 142, respectively. The response of CSR 115 thereto is to reset its HALT bit and, consequently, to deassert BUS REQUEST line 146.

Deassertion of BUS REQUEST line 146 causes CPU/MMU 111 to continue its normal operation. Following reset, this operation involves initialization, which begins by execution of a boot program stored beginning at a single predetermined address in memory. This single address is set to be the SRAM array 119 address at which the boot program begins. Accordingly, CPU/MMU 111 generates an SRAM array 119 address on ADDRESS lines 141. This single address is recognized as an SRAM array 119 address by address decoder 116, which responds by asserting SRAM SELECT line 150. CACHEON line 148 is still deasserted, so cache control portion 131 is active, and it responds to assertion of SRAM SELECT line 150 by issuing a strobe to SRAM array 119 on R/W strobe line 149. SRAM array 119 responds to the strobe signal by outputting on DATA lines 142 the instruction stored at the single address appearing on ADDRESS lines 141. CPU/MMU 111 then receives the instruction over DATA lines 142 and executes it. This cycle is repeated until CPU/MMU 111 completes execution of the boot program. Hence, SRAM array 119 serves as the boot memory for CPU/MMU 111.

Having been booted, CPU/MMU 111 can now begin to access and execute programs from main memory 109. These may be further initialization programs, for example. Upon completion of initialization, when CPU/MMU 111 is about to enter normal operating mode including virtual addressing mode, CPU/MMU 111 sets the CACHEON bit of CSR 115. CPU/MMU 111 accesses the CSR 115 by generating the address of CSR 115 on ADDRESS lines 141. The address is recognized by address decoder 116, which asserts CSR SELECT line 151 in response. CSR 115 responds to assertion of CSR SELECT line 151 by allowing CPU/MMU 111 a write access to CSR 115 via the ADDRESS and DATA lines 141 and 142.

CSR 115 responds to setting of the CACHEON bit by asserting CACHEON line 148. Assertion of CACHEON line 148 disables cache control portion 131, so that it no longer responds to assertions by address decoder 116 of SRAM SELECT line 150, and enables cache control portion 132 to control SRAM 119. As was mentioned above, control portion 132 causes SRAM 119 to function as a virtual data-and-instruction cache memory for CPU/MMU 111, in a conventional manner. Upon being enabled, control portion 132 initializes the cache by flushing, that is, invalidating, its contents.

Henceforth, the system of FIG. 1 functions conventionally, until the next time that system reset line 104 is asserted. At that time, the operations described herein are repeated.

Of course, various changes and modifications to the illustrative embodiment described above will be apparent to those skilled in the art. For example, the system of FIG. 1 may include more than one slave processor 110. Or, the system may be a uniprocessor, wherein the multi-purpose memory of the single processor is loaded with the boot program by some other system unit, such as an I/O controller. Also, other functions, such as scratch memory functions, may be included among the functions of the multi-purpose memory. Such changes and modifications can be made without departing from the spirit and the scope of the invention and without diminishing its attendant advantages. It is therefore intended that such changes and modifications be covered by the following claims.

What is claimed is:

1. A multiprocessor system comprising:
   (A) a first processor including
      (1) a processing unit,
      (2) a cache memory arrangement comprising
         (a) a random access memory connected to the processing unit, and comprising a plurality of addressable memory locations,
         (b) first means coupled to the memory which, when activated, causes each memory location to be addressable by only one unique address, to function thereby as a boot memory for the processing unit, and
         (c) second means coupled to the memory which, when activated, causes each said memory location to be addressable by any one of a plurality of addresses, to function thereby as a cache memory for the processing unit, and
      (3) third means connected to the first and the second means, for selectively activating one of the first and the second means while deactivating the other of the first and the second means; and
   (B) a second processor for causing the third means to activate the first means and for effecting retrieval of a boot program from a storage means external to the first processor and for effecting storage in the random access memory of said boot program for use by the processing unit.

2. A method of operating a multiprocessor system which includes a first processor and a cache memory arrangement having a random access memory connected to the processor unit, said memory coupled to first and second means and having a plurality of addressable memory locations, said method comprising:

a first step of activating a first means which controls the memory to operate in a first mode, in said first mode each memory location of said memory being addressable by only one unique address and thereby functioning as a boot memory for the processor unit, a second step of activating a second means which controls the memory to operate in a second mode, in said second mode each memory location of said memory being addressable by any one of a plurality of addresses for each location and thereby functioning as a cache memory for the processor unit, a step of selectively operating one of said steps of activating which results in the exclusive operation of one of the first and second modes, and a third step carried out by a second processor using said selectively operating step to activate said first means and store a boot program, which has been retrieved from a storage means external to the first processor, in said second memory for use by said first processor.

* * * * *